United States Patent [19]
Gregory et al.

[11] Patent Number: 5,194,568
[45] Date of Patent: Mar. 16, 1993

[54] STAGED POLYMERIZATION OF POLYBENZAZOLE POLYMERS

[75] Inventors: Thomas Gregory, Midland, Mich.; Carl W. Hurtig, Stade, Fed. Rep. of Germany; Harvey D. Ledbetter, Midland; Kenneth J. Quackenbush, Saginaw; Steven Rosenberg; Ying H. So, both of Midland, all of Mich.

[73] Assignee: The Dow Chemical Company, Midland, Mich.

[21] Appl. No.: 600,551

[22] Filed: Oct. 19, 1990

[51] Int. Cl.$^5$ .................. C08G 63/00; C08G 69/26; C08G 63/68; C08G 69/42

[52] U.S. Cl. .................. 528/184; 528/176; 528/183; 528/185; 528/188; 528/327; 528/330; 528/331; 528/337; 528/341; 528/342; 528/346; 528/347; 528/348; 528/352; 528/353; 528/364

[58] Field of Search .............. 528/184, 183, 185, 176, 528/188, 327, 330, 331, 337, 341, 342, 346, 347, 348, 352, 353, 364; 524/417, 706; 526/59, 60

[56] References Cited

U.S. PATENT DOCUMENTS

| | | | |
|---|---|---|---|
| 4,229,566 | 10/1980 | Evers et al. | 528/172 |
| 4,359,567 | 11/1982 | Evers | 528/184 |
| 4,423,202 | 12/1983 | Choe | 528/183 |
| 4,533,693 | 8/1985 | Wolfe et al. | 528/183 |
| 4,578,435 | 3/1986 | Tsai et al. | 528/342 |
| 4,772,678 | 9/1988 | Sybert et al. | 528/179 |

FOREIGN PATENT DOCUMENTS 63-256622 10/1988 Japan.
9003995 4/1990 PCT Int'l Appl..

OTHER PUBLICATIONS

Ledbetter et al., "An Integrated Laboratory Process for Preparing Rigid Rod Fibers from the Monomers," *The Materials Science and Engineering of Rigid-Rod Polymers*, pp. 253-263.

Primary Examiner—John Kight, III
Assistant Examiner—Terressa M. Mosley

[57] ABSTRACT

It is advantageous to prepare oligomers of polybenzazole polymers by reaction of AA-PBZ monomer with an excess of BB-PBZ monomer. The resulting oligomer dopes may be stored at a temperature at which they remain pumpable until such time as the dope can be advanced to higher molecular weight by adding additional AA-PBZ monomer. The molecular weight of the polymer may be adjusted by controlling the amount of chain extender and/or chain terminator added to oligomer mixtures as they are advanced to final molecular weight.

14 Claims, No Drawings

STAGED POLYMERIZATION OF POLYBENZAZOLE POLYMERS

BACKGROUND OF THE INVENTION

This invention relates to the art of polybenzazole (PBZ) polymers and processes for synthesizing them.

Polybenzazole polymers are a known class of polymers comprising polybenzoxazole (PBO), polybenzothiazole (PBT), polybenzimidazole (PBI) and copolymers of these polymers. Polybenzazoles are generally classified as AB-polymers, containing a plurality of mer units depicted in formula 1(a), or AA/BB, containing a plurality of mer units which conform with formula 1(b)

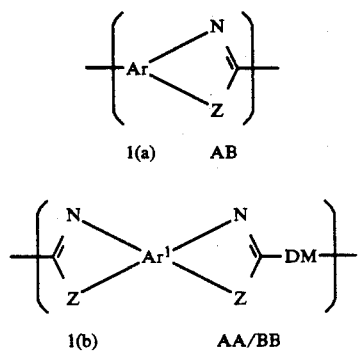

1(a)  AB

1(b)  AA/BB wherein:

each Ar is an aromatic group,

DM is a divalent organic moiety which is stable and inert under polymerization conditions, and each Z is independently an oxygen atom, a sulfur atom, or a nitrogen atom that is bonded to a hydrogen atom or an organic moiety which is stable and inert in acid under polymerization conditions.

(For the purpose of this application, when the nitrogen atoms and Z moieties of a mer unit are depicted as bonded to an aromatic group without indicating their position, as in Formulae 1(a)-(b), it shall be understood that:

(1) each nitrogen atom and Z group within a given azole ring are bonded to the aromatic group in ortho position with respect to each other; and (2) if the mer unit has two azole rings, one nitrogen atom and Z moiety may be in either cis position or trans position with respect to the other nitrogen atom and Z moiety, for example illustrated in 11 Ency. Poly. Sci. & Eng., *Polybenzothiazoles and Polybenzoxazoles*, at 602 (J. Wiley & Sons 1988), which is incorporated herein by reference. The same understandings apply with respect to amine groups and Z moieties in a BB-PBZ monomer.)

AA/BB-Polybenzazoles are synthesized by the reaction of at least one AA-PBZ monomer containing two electron-deficient carbon groups with at least one BB-PBZ monomer containing two o-amino-basic moieties. The reaction is illustrated generally in Formula 2:

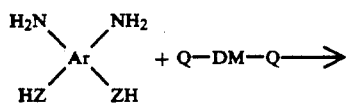

+ Q—DM—Q ⟶

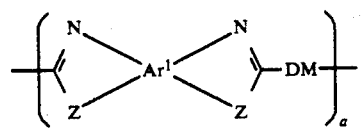

wherein each Q is an electron-deficient carbon group and all other moieties have the meaning and preferred embodiments previously given. The divalent organic moiety DM of the AA-monomer ordinarily comprises an aromatic group, which is most usually a p-phenylene group. The reaction is ordinarily carried out under non-oxidizing conditions in a non-oxidizing, dehydrating solvent acid, which is most frequently polyphosphoric acid.

Free base BB-PBZ monomers are susceptible to air oxidation. The monomers are typically handled and stored as hydrogen halide salts, because the salt is more stable with respect to oxidation.

The volatile hydrogen halide protecting acid is displaced by the solvent acid when the monomer is placed in solution. Afterwards, the volatile acid can interfere with the polymerization. Therefore, the volatile protective acid is ordinarily removed from the reaction solution in a devolatilization step before commencing polymerization. Devolatilization is frequently carried out at moderate temperatures (45° C. to 100° C.) in a polyphosphoric acid solution having a relatively low $P_2O_5$ content (76 to 80 weight percent). The polymerization is carried out after devolatilization, at higher temperatures (150 to 220) in a solution having a higher $P_2O_5$ content (80 to 90 weight percent), which is achieved by adding $P_2O_5$ to the reaction mixture after the devolatilization step.

Polybenzazole polymers, their properties and their synthesis are discussed in detail in the following references: Sybert et al., *Liquid Crystalline Polymer Compositions, Process and Products*, U.S. Pat. No. 4,772,678 (Sep. 20, 1988): Wolfe et al., *Liquid Crystalline Polymer Compositions, Process and Products*, U.S. Pat. No. 4,703,103 (Oct. 27, 1987): Wolfe et al., *Liquid Crystalline Polymer Compositions, Process and Products*, U.S. Pat. No. 4,533,692 (Aug. 6, 1985): Wolfe et al., *Liquid Crystalline Poly(2,6-Benzothiazole) Compositions, Process and Products*, U.S. Pat. No. 4,533,724 (Aug. 6, 1985): Wolfe, *Liquid Crystalline Polymer Compositions, Process and Products*, U.S. Pat. No. 4,533,693 (Aug. 6, 1985): Imai et al. "Polybenzoxazoles and Polybenzothiazoles," 83 Makromol. Chem. 167 (1965), Evers, *Thermooxadatively Stable Articulated p-Benzobisoxazole and p-Benzobisthiazole Polymers*, U.S. Pat. No. 4,359,567 (Nov. 16, 1982): Tsai et al., *Method for Making Heterocyclic Block Copolymer*, U.S. Pat. No. 4,578,432 (Mar. 25, 1986) and 11 Ency. Poly. Sci. & Eng., *Polybenzothiazoles and Polybenzoxazoles*, 601 (J. Wiley & Sons 1988), which are incorporated herein by reference.

The dopes resulting from polymerization are typically spun and drawn to form fibers by a dry-jet, wet spin process. Effective fiber spinning demands that the dope have very uniform and consistent properties, such as viscosity, both within each polymerization run and from one run to the other. The polymerization of polybenzazole contains many variables that can cause small changes in polymer and/or dope properties which are sufficient to affect the fiber quality. A method is needed to obtain a dope having consistent and reproducible properties.

The dehydrohalogenation of the reaction mixture is a particularly time consuming part of the polymerization process. It would be desirable to store dehydrohalogenated reaction mixtures for long periods of time until they are needed.

SUMMARY OF THE INVENTION

One aspect of the present invention is a process for synthesizing an AA/BB-polybenzazole polymer comprising the steps of:

(1) contacting an AA-PBZ monomer with a selected molar excess of BB-PBZ monomer in a dehydrating solvent acid under conditions such that the monomers react to form polybenzazole oligomer:
(2) maintaining the solution containing solvent acid and polybenzazole oligomer that results from step (1) under conditions such that the oligomers remain reactive to form higher molecular weight polymers:
(3) contacting the solution resulting from step (2) with a selected amount of AA-PBZ monomer under conditions such that the polybenzazole oligomers and AA-PBZ monomer react to form polybenzazole polymers.

A second aspect of the present invention is a process for synthesizing an AA/BB-polybenzazole polymer comprising the steps of:

(1) contacting a selected amount of AA-PBZ monomer with a selected amount of BB-PBZ monomer in a dehydrating solvent acid under conditions such that a mixture containing a polybenzazole oligomer is formed:
(2) contacting a portion of the mixture resulting from Step (1) with a selected amount of chain extender and/or chain terminator in a continuous reactor with a residence time of no more than about one hour under conditions such that a dope containing higher molecular weight polybenzazole polymers is formed:
(3) measuring a property of the dope and/or polymer resulting from step (2): and
(4) adjusting the selected amount of chain extender and/or chain terminator added to the remaining portions of the mixture in step (2) to obtain a dope and/or polymer in which the measured property meets a selected value.

The staged reactions of the present invention are useful for the large-scale synthesis of polybenzazole polymers. The oligomer solutions resulting from step 1 of each process are stable. They may be stored for several days and still be reacted to a high molecular weight. The second process contains the additional advantage that properties such as the molecular weight of the polymer or the bulk viscosity of the dope may be tailored to a desired level easily and reproducibly.

DETAILED DESCRIPTION OF THE INVENTION

Definitions

The following terms are used repeatedly throughout this application, and have the meaning and preferred embodiments defined herein unless otherwise specified.

AA-PBZ Monomer—A monomer suitable for synthesizing polybenzazole polymers, comprising two electron-deficient carbon groups linked by a divalent organic moiety (DM) which is stable so that it does not interfere with the synthesis, fabrication and use of the polybenzazole polymer. The electron-deficient carbon groups have the definition and preferred embodiments given herein. The divalent organic moiety is preferably alkyl or an aromatic group, as herein defined, is more preferably an aromatic group, and is most preferably a six-membered aromatic group. Examples of suitable AA-PBZ monomers and references to their synthesis are provided in U.S. Pat. No. 4,533,693 at Col. 25-32, Tables 4-6, which is incorporated herein by reference. Preferred examples of AA-PBZ monomers include terephthalic acid, isophthalic acid, bis-(4-benzoic) acid and oxy-bis-(4-benzoic acid) and acid halides thereof.

AB-PBZ Monomer—A monomer suitable for synthesizing polybenzazole polymers, comprising an aromatic group, an o-amino-basic moiety bonded to the aromatic group, and an electron-deficient carbon group linked to the aromatic group. The aromatic group, the electron-deficient carbon group and the o-amino-basic moiety have the definitions and preferred embodiments given herein. Examples of suitable AB-monomers and processes for their synthesis are provided in U.S. Pat. No. 4,533,693 at Col. 33-35, Tables 7-8, which is incorporated herein by reference. Preferred examples of AB-monomers include 3-amino-4-hydroxybenzoic acid, 3-hydroxy-4-aminobenzoic acid and the acid halides thereof. AB-monomers are frequently stored as salts of hydrogen chloride or phosphoric acid, because the free-base of the monomer is susceptible to air oxidation.

o-Amino-basic moiety—a moiety, which is bonded to an aromatic group, consisting of (1) a primary amine group bonded to the aromatic group and
(2) a hydroxy, thiol or primary or secondary amine group bonded to the aromatic group ortho to said primary amine group.

It preferably comprises a hydroxy, thiol or primary amine moiety, more preferably comprises a hydroxy or thiol moiety, and most preferably comprises a hydroxy moiety. Secondary amine groups comprise an aromatic or an aliphatic group and preferably an alkyl group. The secondary amine group preferably comprises no more than about 6 carbon atoms, more preferably no more than about 4 carbon atoms and most preferably no more than about 1 carbon atom.

Aromatic group (Ar)—any aromatic ring or ring system. Size is not critical as long as the aromatic group is not so big that it prevents further reactions of the moiety in which it is incorporated. Each aromatic group independently preferably comprises no more than about 18 carbon atoms, more preferably no more than about 12 carbon atoms and most preferably no more than about 6 carbon atoms. Each may be heterocyclic but is preferably carbocyclic and more preferably hydrocarbyl. If the aromatic group is heterocyclic, the heteroatom is preferably nitrogen.

Unless otherwise specified, each aromatic group may comprise a single aromatic ring, a fused ring system or an unfused ring system containing two or more aromatic moieties joined by bonds or by divalent moieties (DL) which are inert with respect to PBZ polymerizing reagents under polymerization conditions. Suitable divalent moieties comprise, for example, a carbonyl group, a sulfonyl group, an oxygen atom, a sulfur atom, an alkyl group and/or and or a perfluorinated alkyl group. Each aromatic group is preferably a single six-membered ring.

Each aromatic group may contain substituents which are stable in solvent acid and do not interfere with further reactions of the moiety which the aromatic group is part of. Examples of preferred substituents include halogens, alkoxy moieties, aryloxy moieties or alkyl groups. More preferred substituents are either an alkyl group having no more than about 6 carbon atoms or a halogen. Most preferably, each aromatic group contains only those substituents specifically called for hereinafter.

Azole ring—an oxazole, thiazole or imidazole ring. The carbon atom bonded to both the nitrogen atom and the oxygen, sulfur or second nitrogen atom is the 2-carbon, as depicted in Formula 3

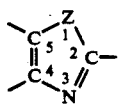

wherein Z is —O—, —S— or —NR—; and R is hydrogen, an aromatic group or an aliphatic group, preferably hydrogen or an alkyl group, and most preferably hydrogen. R preferably comprises no more than about 6 carbon atoms, more preferably no more than about 4 and most preferably no more than about 1. Each azole ring is independently preferably oxazole or thiazole and more preferably oxazole. In PBZ polymers, the 4- and 5-carbon of each azole ring is ordinarily fused with an aromatic group.

Azole-forming moiety—an "o-amino-basic moiety" or "electron-deficient carbon group," as those terms are defined herein.

BB-PBZ Monomer—A monomer suitable for synthesizing polybenzazole polymers, comprising an aromatic group and two o-amino-basic moieties which are bonded to the aromatic group. The aromatic group and the o-amino-basic moieties have the definitions and preferred embodiments given herein. Examples of suitable BB-PBZ monomers and processes for synthesis are provided in U.S. Pat. No. 4,533,693 at Col. 19-24, Tables 1-3, which is incorporated herein by reference. Examples of preferred BB-PBZ monomers include 4,6-diaminoresorcinol, 2,5-diaminohydroquinone and 1,4-dithio -2,5-diaminobenzene. BB-PBZ monomers are frequently stored as salts of hydrogen chloride or phosphoric acid, because the free base of the monomer is susceptible to air oxidation.

Electron-deficient carbon group (Q)—any group containing a carbon atom which can react in the solvent acid with an o-amino-basic moiety to form an azole ring, such as the groups listed in Col. 24, lines 59-66 of the U.S. Pat. No. 4,533,693, which is incorporated herein by reference. Preferred electron-deficient carbon groups are carboxylic acids, acid halides, metal carboxylate salts, cyano groups and trihalomethyl groups. Halogens in electron-deficient carbon groups are preferably chlorine, bromine or iodine and more preferably chlorine.

Polybenzazole (PBZ) polymer—A polymer from the group of polybenzoxazoles and polybenzobisoxazoles (PBO), polybenzothiazoles and polybenzobisthiazoles (PBT) and polybenzimidazoles or polybenzobisimidazoles (PBI). For the purposes of this application, the term "polybenzoxazole (PBO)" refers broadly to polymers in which each mer unit contains an oxazole ring bonded to an aromatic group, which need not necessarily be a benzene ring. The term "polybenzoxazole (PBO)" also refers broadly to poly(phenylene-benzobis-oxazole)s and other polymers wherein each mer unit comprises a plurality of oxazole rings fused to an aromatic group. The same understandings shall apply to the terms polybenzothiazole (PBT) and polybenzimidazole (PBI).

Rigid Rod PBZ polymer—An "intrinsic" or "articulated" rigid rod PBZ polymer as the terms "intrinsic" and "articulated" are defined in the Hwang, "Processing, Structure and Properties of Liquid Crystalline PBT Polymer", Kansai Committee of the Society of Fiber Science and Technology, Japan, Post Symposium on Formation, Structure and Properties of High Modulus and High Tenacity Fibers 23-26 (Aug. 26, 1985); Evers et al, "Articulated All-Para Polymers with 2,6-Benzobisoxazole, 2,6-Benzobisthiazole, and 2,6-Benzobisimidazole Units in the Backbone," 14 Macromolecules 925 (1981); Evers, "Thermooxadatively Stable Articulated Benzobisoxazole and Benzobisthiazole Polymers," 24 J. Poly. Sci. Part A 1863 (1986) and Evers et al., *Articulated Para-Ordered Aromatic Heterocyclic Polymers Containing Diphenoxybenzene Structures,* U.S. Pat. No. 4,229,566 (Oct. 21, 1980).

Intrinsic rigid rod polymers are essentially rectilinear and consist essentially of mer units having an angle of catenation of at least about 150°. Articulated rigid rod polymers comprise a plurality of essentially rectilinear moieties joined by a relatively small number of non-linear moieties. Rigid rod PBZ polymers used in the present invention are preferably intrinsic rigid rod polymers. If articulated, they preferably comprise on average no more than about 1 non-linear mer unit for each 9 essentially rectilinear mer units.

Solvent acid—any non-oxidizing liquid acid capable of dissolving PBZ polymers, such as sulfuric acid, methanesulfonic acid, trifluoromethylsulfonic acid, polyphosphoric acid and mixtures thereof. It must be sufficiently non-oxidizing that it does not substantially oxidize AB- and BB-PBZ monomers which are dissolved therein. Solvent acids are preferably dehydrating acids, such as polyphosphoric acid or a mixture of methanesulfonic acid and phosphorus pentoxide. Preferred concentrations of $P_2O_5$ in the methanesulfonic acid are described in U.S. Pat. Nos. 4,847,350 and 4,722,678, which are incorporated by reference. Concentrations of $P_2O_5$ in the polyphosphoric acids are described in U.S. Pat. Nos. 4,533,693 and 4,722,678, which are incorporated by reference.

DESCRIPTION OF THE INVENTION

AA- and BB-PBZ monomers are polymerized in the present invention. The reaction mixture may also contain a minor amount of AB-monomer, but preferably it does not. The monomers are more preferably chosen to provide a rigid rod polybenzoxazole or polybenzothiazole, and are most preferably chosen to provide rigid rod cis-polybenzoxazole. The monomers are defined and further described in the definitions. The BB-PBZ monomers are preferably added as the salt of a stabilizing acid, such as hydrogen chloride or phosphoric acid.

The monomers polymerize by a condensation process. It is convenient to think of the reaction as occurring in four stages. In the first (mixing) stage, at least the BB-PBZ monomers are mixed with a solvent. In the second (devolatilization) stage, volatile protecting acids are drawn off from the reaction mixture, if necessary. In the third (oligomerization) stage, the AA- and BB-PBZ monomers react to form oligomers. In the fourth (advancement) stage, the oligomers react to form high molecular weight polymer. The present invention relates primarily to the oligomerization and advancement stages of the reaction.

There is no sharp dividing line for these stages. Devolatilization may commence as the monomers are mixed with the solvent. The devolatilization and oligomerization stages may be carried out simultaneously in the same piece of equipment. There is not a generally recognized point at which a polymer is at too high a molecular weight for the oligomerization stage or too low a molecular weight for the advancement stage. Depending upon the equipment used, the oligomerization should preferably be discontinued when the polymer reaches a molecular weight sufficiently high for it to be stored in solution without degradation and sufficiently low for the solution to be pumpable.

Certain reaction conditions are equally applicable in all stages. The reaction should take place in a solvent acid under dehydrating conditions. The conditions should be non-oxidizing, such as nitrogen or noble gas atmosphere or vacuum. The pressure may be atmospheric, subatmospheric or superatmospheric, but should permit the removal of volatile compounds that interfere with polymerization.

In the first stage of the process, a selected amount of BB-PBZ monomer is mixed with a reaction solvent, which is preferably a solvent acid. The amount of BB-PBZ monomer is preferably sufficient to provide a liquid crystalline solution when the polymerization is complete. The concentration of BB-PBZ monomer is preferably sufficient to provide a finished dope containing at least about 7 percent polymer, more preferably at least about 12 percent polymer and most preferably at least about 15 percent polymer, by weight. The maximum concentration of monomer is typically limited by practical considerations such as solubility and viscosity. Ordinarily the concentration of monomers is no more than would be necessary to provide a solution containing about 30 percent polymer, more typically no more than about 21 percent polymer, and most often no more than about 18 percent polymer.

AA-PBZ monomers may be added simultaneously with the BB-PBZ monomers, or the monomers may be added in any order sequentially. Preferably, AA-PBZ monomers are added about simultaneously with the BB-PBZ monomers. More preferably, the ratio of AA-PBZ monomers to BB-PBZ monomers added is about that described hereinafter for the oligomerization step.

The solvent is preferably a solvent acid, as previously defined, and is most preferably a polyphosphoric acid. The solvent may be a low $P_2O_5$ polyphosphoric acid (such as about 77 weight percent $P_2O_5$) or a commercial polyphosphoric acid (such as about 83 percent $P_2O_5$) at the time that mixing is commenced, but it preferably contains higher levels of $P_2O_5$ at the commencement of the oligomerization step, as described hereinafter. This is preferably accomplished by adding extra $P_2O_5$ to the solvent acid during the mixing step. The extra $P_2O_5$ is more preferably added to the solvent and mixed in at about the same time that the monomers are added and mixed in.

The temperature of mixing is preferably at least about 25° C., more preferably at least about 45° C. and most preferably at least about 55° C. It is preferably low enough that the monomer does not substantially degrade. It is preferably no more than about 150° C., more preferably no more than about 100° C. and most preferably no more than about 70° C. The monomer and $P_2O_5$ added are preferably micronized. Certain monomers, such as terephthalic acid, may be substantially insoluble in the solvent acid. Mixing need not be carried out to dissolve all monomers, but it is preferably carried out for a time sufficient to at least wet all monomer. Then the second stage of the reaction is preferably commenced immediately.

The second (devolatilization) stage may be unnecessary with proper choice of monomers. Certain monomers, such as BB-PBZ monomer phosphate salts and terephthalic acids, do not release volatile compounds and do not require devolatilization. Reactions carried out without devolatilization are described in Harris et al., U.S. Ser. No. 341,502 (filed Apr. 21, 1989), which is incorporated herein by reference. If the monomers do release volatile components, such as hydrogen chloride from BB-PBZ monomer hydrohalide salts and terephthaloyl halides, then the reaction mixture should be devolatilized.

The temperature of the devolatilization stage is preferably high enough to drive out volatile protecting acids in a rapid fashion, and low enough to avoid substantial decomposition of the unpolymerized monomers. The temperature is preferably no more than about 190° C., more preferably no more than about 150° C., and most preferably no more than about 130° C. It is preferably at least about 40° C., more preferably at least about 60° C., and most preferably at least about 100° C.

The devolatilization is preferably carried out with vigorous mixing. Examples of suitable mixing equipment includes all of the equipment listed in U.S. Pat. No. 4,772,678 in Col. 44–45, which is incorporated herein by reference. Preferred examples include single or multiple screw extruders, piston-agitated reactors, Sigma blade mixers, helical mixers (such as dual helical ribbon mixer) and multiple impeller mixers.

When the solvent is polyphosphoric acid, the polyphosphoric acid may contain as little as 76 percent $P_2O_5$ or less at the beginning of the devolatilization step, but it preferably contains at least about 80 weight percent $P_2O_5$, more preferably at least about 85 weight percent, and most preferably at least about 88 weight percent. The concentration of $P_2O_5$ in the polyphosphoric acid must be low enough to allow adequate mixing. It is preferably no more than about 94 weight percent and more preferably no more than about 92 weight percent.

Under preferred conditions, devolatilization of 10 lbs or more of diaminoresorcinol bis(hydrogen chloride) salt can be essentially completed in a few hours. The rapid evolution of volatiles in viscous reaction mixtures may cause foaming, as previously described in the literature.

Foaming may be minimized by several techniques. For instance, the devolatilization reactor may have a high surface-to-volume ratio as described in U.S. Pat. No. 4,772,678, which is incorporated herein by reference. The BB-monomer salt may have a large particle size, such as at least about 40 mesh or greater. The larger particle is dissolved more slowly into the polyphosphoric acid, thus spreading out the evolution of the volatile acid. The monomers may be chosen to minimize the level of volatile components in the system, such as polymerizing terephthalic acid (rather than terephthaloyl chloride) with the BB-PBZ monomer bis(hydrogen chloride) salt. The pressure of the devolatilization reactor may be controlled to minimize foaming The mixing apparatus may be chosen to help break foam. The devolatilization reactor should have a reasonable amount of head space to permit some level of foaming.

If the reaction mixture contains both AA-monomers and BB-PBZ monomers during mixing and/or devolatilization, then the oligomers ordinarily begin forming during the devolatilization stage. Otherwise, the AA-PBZ monomer is preferably added and oligomerization is preferably commenced almost immediately after devolatilization is completed. We have learned that the devolatilized BB-PBZ monomer is susceptible to thermal degradation at moderate temperatures, such as 150° C. to 190° C. Functionally terminated oligomers are more stable, and their stability increases with increasing degree of polymerization. Therefore, the devolatilized reaction mixture is preferably stored after the oligomerization stage, rather than before it. The oligomerization stage is preferably commenced as quickly as possible.

The reaction mixture preferably contains an excess of BB-PBZ monomers. The unbalanced stoichiometry ensures that the oligomerization stage stops at a relatively reproducible point. It also ensures that the reaction does not continue to build a high molecular weight polymer while the dope is stored (otherwise the dope might be too viscous to pump out of the storage tank after storage). Ordinarily, excesses of BB-PBZ monomer are effective to hold down the molecular weight of rigid polybenzazole polymer. It has been reported in the literature that excess AA-PBZ monomer has little or no effect on the molecular weight of rigid rod polybenzazole polymers. It is theorized, without intending to be bound, that the insolubility of many common AA-PBZ monomer in solvent acids is responsible for that behavior.

The reaction mixture preferably contains no more than about 0.99 moles of AA-PBZ monomer per mole of BB-PBZ monomer during the oligomerization step. It more preferably contains no more than about 0.98 moles of AA-PBZ monomer per mole of BB-PBZ monomer. The reaction mixture preferably contains at least about 0.75 mole of AA-monomer per mole of BB-monomer, more preferably at least about 0.85 mole, and most preferably at least about 0.90 mole.

The oligomerization step is carried out under known conditions. The solvent acid should be dehydrating, as described in U.S. Pat. Nos. 4,533,693 and 4,847,350, which are incorporated herein by reference. The solvent acid is preferably a high $P_2O_5$ polyphosphoric acid as previously described. The temperature is preferably at least about 60° C., more preferably at least about 100° C. and most preferably at least about 120° C. It is preferably no more than about 190° C., more preferably no more than about 170° C., and most preferably no more than about 150° C. The oligomerization is preferably carried out with vigorous agitation as previously described.

The oligomerization is preferably carried out until the polybenzazole reaches an average molecular weight at which the polybenzazole is substantially stable and the reaction mixture is pumpable. "Substantially stable" means that the reaction mixture can be stored for at least 24 hours at pumpable temperatures and still be advanced to high molecular weight. The dope is preferably storable for at least about 48 hours and more preferably for at least about one week. The temperature for storage is preferably at least about 100° C. and more preferably at least about 120° C. It is preferably no more than about 190° C. and more preferably no more than about 170° C.

The average degree of polymerization at the end of the oligomerization stage is preferably at least about 5, more preferably at least about 10 and most preferably at least about 15. It is preferably at most about 75, more preferably at most about 50, and most preferably at most about 40. The degree of polymerization may conveniently be tracked by measuring the viscosity of the reaction mixture, for instance by measuring the level of power needed for agitation. Such measurements are necessarily dependent upon the equipments used and the specific contents of the reaction mixture. They can easily be optimized by persons of ordinary skill in the art.

In one preferred embodiment, the mixing, devolatilization and oligomerization stages are carried out in a batch reactor. The solvent acid, AA- and BB-PBZ monomers and extra $P_2O_5$ (if any) are added simultaneously to the reactor with agitation at a temperature suitable for mixing. As mixing is accomplished, the temperature and agitation are adjusted for devolatilization and oligomerization.

Following the oligomerization stage, the dope may be stored as previously described or may be pumped directly over to the advancement stage. Storage is preferably at a temperature at which the reaction mixture remains pumpable, as previously described. The storage should be under non-oxidizing conditions, and preferably under essentially no shear. It is more preferably in a separate storage tank to free up the reaction vessels for mixing, devolatilization and oligomerization of a new batch.

The advancement stage is preferably carried out under high temperature and high shear. The temperature is preferably at least about 175° C. and more preferably at least about 190° C. It is preferably at most about 300° C., more preferably at most about 230° C. and most preferably no more than about 220° C. The shear is preferably at least about 100 s$^{-1}$, more preferably at least about 300 s$^{-1}$, and most preferably at least about 500 s$^{-1}$.

The advancement stage is preferably carried out under reduced pressure. The pressure is preferably no more than about 150 mmHg. The minimum pressure is dictated primarily by practical concerns. It is conveniently at least about 1 mmHg.

The solvent in the advancement stage should be dehydrating. For instance, polyphosphoric acid preferably contains at least about 78 weight percent $P_2O_5$, more preferably at least about 80 weight percent and most preferably at least about 83 weight percent, at the beginning of the advancement stage.

In the advancement stage, the monomer level in the reaction mixture should be adjusted to provide a polymer having the desired molecular weight. For instance, a selected quantity of AA-PBZ monomer may be added to the reaction mixture as a chain extender to bring the total AA-PBZ monomer to at least about equimolar proportions. This is particularly desirable if an excess of BB-PBZ monomer was used in the oligomerization step. The extra AA-PBZ monomer is preferably at least about 1 mole percent of the BB-PBZ monomer used in the oligomerization step, more preferably at least about 2 mole percent. It is preferably no more than about 25 mole percent, more preferably no more than about 10 mole percent and most preferably no more than about 4 mole percent.

A chain terminator may be added if it is desirable to hold the molecular weight down during advancement. Examples of suitable chain terminators are described in Wolfe, U.S. Pat. No. 4,772,678 at Col. 22-27 (Sep. 20, 1988), which is incorporated by reference. Suitable chain terminators are typically monofunctional carboxylic acids or derivatives, or o-aminophenols or o-aminothiols or o-diamines. Examples of suitable monofunctional carboxylic acid type terminators include benzoic acid, phenylbenzoic acid, cyclohexane carboxylic acid, picolinic acid, naphthoic acid, acetic acid, propionic acid, and acid halide, ester or nitrile derivatives thereof. Examples of other suitable terminators include o-aminophenol, phenyl-2-aminophenol, o-aminonapthol and variations wherein the hydroxy group is replaced with a thio or amino group. The total amount of chain terminator added is preferably equal to no more than about 5 mole percent of the monomers used in the reaction, more preferably no more than about 2 mole percent and most preferably no more than about 1 mole percent.

Preferably, the stoichiometry of the reaction is adjusted such that the number of reactive sites provided by AA-PBZ monomers is essentially equal to the number of sites provided by the BB-PBZ monomer and aminophenolic terminator.

The advancement may be carried out in a batch reactor, such as a piston-agitated reactor. It may be carried out in the same reactor used for the oligomerization and/or other stages. In a preferred embodiment of the present invention, the advancement step is carried out in a reactor that reacts relatively small quantities of the reaction mixture in a continuous fashion for a relatively short residence time under conditions that will cause the reaction to complete in that time frame. Examples of suitable reactors include single and multiple screw extruders. The properties of the dope or polymer, such as viscosity or molecular weight, can be measured for material leaving the reactor. Then the level of AA-PBZ monomer and/or chain terminator added before or during advancement step can be adjusted until the properties of the polymer and/or dope leaving the reactor meet a selected value.

Under preferred conditions, the residence time is preferably no more than about one hour, more preferably no more than about 20 minutes and most preferably no more than about 10 minutes. If the reaction is not completed to the desired level of advancement, the reaction mixture may even be recirculated through the advancement reactor with more AA-PBZ monomer. The reaction is preferably completed in one pass.

In a preferred embodiment, the oligomerization stage is carried out in a batch reactor, and the advancement stage is carried out in an extruder. More preferably, the mixing, devolatilization and oligomerization stages are all carried out in a single batch reactor.

The processes of the present invention may be used to make low molecular weight polybenzazoles, such as those having an average degree of polymerization between about 6 and about 20. The polymers preferably have a degree of polymerization of at least about 20, more preferably at least about 30 and most preferably at least about 40. The optimal degree of polymerization may vary depending upon the application for the polymer. For some applications, the best degree of polymerization may be at least about 50, 100 or even 150.

When the polymer is a rigid rod polybenzoxazole or polybenzothiazole, it preferably has an single point intrinsic viscosity (as measured in methanesulfonic acid at 25° C.) of at least about 5 dL/g, more preferably at least about 10 dL/g and most preferably at least about 15 dL/g. The single point intrinsic viscosity may go as high as 60 dL/g or more, but it is preferably no more than about 50 dL/g and more preferably no more than about 40 dL/g. The optimal intrinsic viscosity may vary depending upon the application for the polymer. For some applications, the best intrinsic viscosity may be at least about 20, 25 or even 30 dL/g.

The dope resulting from polymerization preferably has a uniform spinnable viscosity. The viscosity is preferably within about 10 percent of the selected value, more preferably within about 5 percent and most preferably within about 1 percent.

The dope can be spun to form fibers or extruded to form films according to known processes, such as the processes described in *The Materials Science and Engineering of Rigid Rod Polymers*, 245-297 (Materials Research Society 1989), which is incorporated herein by reference. The fibers are useful in fiber-based composites and the films are useful in laminates.

The processes of the present invention have several advantages over prior art processes in synthesizing polybenzazole polymers on a large scale. The time consuming mixing, dehydrohalogenation and oligomerization steps can be standardized and run in batch fashion when desired, and then the oligomerized reaction mixture can be stored until needed. When needed, it can be advanced to final molecular weight and in final product form in a relatively short amount of time. Minor variations in monomer or solvent between batches can be easily corrected later in the advancement stage to provide uniform polymer and/or dope. Likewise, different products having different molecular weight and/or viscosity for different applications can be run from the same standard oligomerization batch simply by adjusting the feed of monomer or chain terminator into the advancement reactor. All of the advantages can be realized without the high danger of monomer degradation that exists in devolatilized but unreacted solutions. In the first process there is also no danger of the reaction mixture advancing to a high molecular weight in storage.

ILLUSTRATIVE EMBODIMENTS

The following examples are given to illustrate the invention and should not be interpreted as limiting it in any way. Unless stated otherwise, all parts and percentages are given by weight.

EXAMPLE 1

A standard procedure for mixing, dehydrohalogenation and oligomerization of polybenzazole dopes is established. A 100 lb. quantity of polyphosphoric acid containing 83.7 weight percent $P_2O_5$ is added to a 25 gallon reactor with agitation by a helical dual ribbon impeller. The following dry materials are added at about 60° C. under nitrogen atmosphere: 19.01 lbs. of diaminoresorcinol bis(hydrogen chloride): 14.822 lbs. of terephthalic acid: and 21.988 lbs. of $P_2O_5$. Mixing is continued for 1 hour at 60° C. and for about 6 hours at about 120° C. Hydrogen halide gas evolved is drawn off and recovered. The reaction temperature is raised to 140, until a viscosity of about 300 poise is reached. The resulting solution is pumped into a tank and stored under nitrogen atmosphere at about 120° C.

The reaction mixture is pumped through a twin screw extruder having about a 35:1 length to diameter ratio and an internal diameter of about 30 mm. The temperature is between 190° C. and 210° C. The residence time is about 6 minutes. The flow through the extruder is about 10 lb. of dope per hour. The extruder has a syringe pump that can introduce a measured flow of liquid into the extruder. A solution of polyphosphoric acid and o-aminophenol is introduced as shown in Table 1. The dope leaving the extruder passes through a series of four static mixing elements. The effect of the chain terminator on the dope is monitored by monitoring the pressure drop across the mixers. The resulting polymer is recovered by precipitation in water. Its single point intrinsic viscosity is measured in methanesulfonic acid at 30° C. and a concentration of 0.05 g/dL. The single point intrinsic viscosity is shown in Table 1. It relates in a linear manner to the pressure drop across the mixers.

TABLE 1

| Sample | terminator concentration (%) | terminator solution (cc/hour) | inherent viscosity (dL/g) |
| --- | --- | --- | --- |
| 1 | 1 | 52.5 | 33.4 |
| 2 | 1 | 105 | 31.5 |
| 3 | 10 | 10.5 | 32.9 |
| 4 | 10 | 21 | 29.9 |
| 5 | 10 | 31.5 | 26.7 |
| 6 | — | 0 | 42.3 |

EXAMPLE 2

The process of Example 1 is repeated using an excess of 4,6-diaminoresorcinol and no terminator. The resulting polymer has an intrinsic viscosity of less than 25 dL/g. The syringe pump is used to add a mixture of 10 weight percent terephthalic acid and polyphosphoric acid at the rate indicated in Table 2. The pressure drop across the static mixers is measured, and an estimated single point intrinsic viscosity is calculated using the previously calculated relationship.

TABLE 2

| Sample | chain extender solution feed rate (g/hr) | Pressure Drop (psi) | estimated inherent viscosity (dL/g) |
| --- | --- | --- | --- |
| 7 | 0 | 91 | <25 |
| 8 | 0.59 | 130 | 28 |
| 9 | 0.89 | 160 | 31 |
| 10 | 1.19 | 201 | 34 |
| 11 | 1.48 | 205 | 35 |
| 12 | 1.78 | 183 | 33 |
| 13 | 2.37 | 165 | 31 |
| 14 | 2.97 | 153 | 30 |
| 15 | 3.56 | 133 | 28 |

EXAMPLE 3

A mixture containing 250 g of 4,6-diaminoresorcinol bis(hydrogen chloride), 133.6 g of micronized terephthalic acid, 1267 g of 82.5 percent polyphosphoric acid and 508 g of $P_2O_5$ is agitated under nitrogen atmosphere using a helical dual ribbon impeller at 120° C. for 6 days, using a nitrogen purge with the outflow leading to a hydrochloric acid scrubbing device. A 227 g quantity of the mixture is withdrawn. It is mixed with 5.6 g of terephthalic acid and heated under nitrogen atmosphere with agitation for 8 hours at 210° C. The resulting cis-PBO polymer has an single point intrinsic viscosity of about 27 dL/g in methanesulfonic acid at 25° C. and a concentration of 0.05 g/dL.

EXAMPLE 4

A mixture containing 200 g of 4,6-diaminoresorcinol bis(hydrogen chloride), 116.85 g of micronized terephthalic acid, 947 g of 82.5 percent polyphosphoric acid, 6.3 g of tin (II) chloride dihydrate and 140 g of $P_2O_5$ is agitated under 1 mm Hg pressure using a helical dual ribbon impeller at 120° C. for 23 hours and at 150 for 3 hours, using a nitrogen purge with the outflow leading to a hydrochloric acid scrubbing device. Agitation is continued at 150° C. for 62 hours under 1 atmosphere nitrogen pressure. A 197 g quantity of $P_2O_5$ and 38.95 g of terephthalic acid are added at 120. The mixture is heated under nitrogen atmosphere at 210° C. in a piston—agitated reactor until it is completed. The resulting cis-PBO polymer has an single point intrinsic viscosity of about 31 dL/g in methanesulfonic acid at 25° C. and a concentration of 0.05 g/dL.

What is claimed is:

1. A process for synthesizing a polybenzazole polymer comprising the steps of:
   (1) contacting a selected amount of AA-PBZ monomer with a selected amount of BB-PBZ monomer in a dehydrating solvent acid under conditions such that a mixture containing a polybenzazole oligomer is formed;
   (2) contacting a portion of the mixture resulting from Step (1) with a selected amount of chain extender or chain terminator in a continuous reactor with a residence time of no more than about one hour under conditions such that a dope containing higher molecular weight polybenzazole polymers is formed;
   (3) measuring the viscosity of the dope or the molecular weight of the polymer resulting from step (2); and
   (4) adjusting the selected amount of chain extender or chain terminator added to the remaining portions of the mixture in step (2) to obtain a dope or polymer in which the measured viscosity or molecular weight meets a selected value.

2. The process of claim 1 wherein the monomers are suitable to produce a polybenzoxazole or polybenzothiazole polymer.

3. The process of claim 2 wherein the total amount of additional AA-PBZ monomer added during or immediately prior to the advancement step is no more than about 25 mole percent of the amount of BB-PBZ monomer used in the reaction, and the amount of chain terminator used in the reaction is no more than 5 mole percent of the total amount of monomers used in the reaction.

4. The process of claim 3 wherein the residence time of the solution in the reactor is not more than about 20 minutes.

5. The process of claim 4 wherein the reactor is a single or multiple screw extruder.

6. The process of claim 4 wherein neither the AA-PBZ monomer nor the BB-PBZ monomer is in more than a 20 percent molar excess in step (1) of the process.

7. The process of claim 6 wherein neither the AA-PBZ monomer nor the BB-PBZ monomer is in more than a 4 percent molar excess in step (1) of the process.

8. The process of claim 6 wherein the AA-PBZ monomers are terephthalic acid, bis(4-benzoic acid), or acid halides or esters thereof.

9. The process of claim 8 wherein the BB-monomer is 4,6-diaminoresorcinol or a salt thereof.

10. The process of claim 8 wherein the BB-monomer is 2,5-diaminohydroquinone or a salt thereof.

11. The process of claim 8 wherein the BB-monomers is 2,5-diamino-1,4-dithiobenzene or a salt thereof.

12. The process of claim 4 wherein an AA-PBZ monomer is added during the advancement stage as a chain extender.

13. The process of claim 4 wherein a monofunctional carboxylic acid or acid derivative is added during the advancement stage as a chain terminator.

14. The process of claim 4 wherein an o-aminophenolic compound, an o-aminothiol compound or an o-diamine compound is added during the advancement stage as a chain terminator.

* * * * *